US012563239B2

(12) United States Patent
Ebersviller

(10) Patent No.: US 12,563,239 B2
(45) Date of Patent: Feb. 24, 2026

(54) METHODS, SYSTEMS, AND APPARATUSES FOR DETECTING BLOCKINESS IN CONTENT

(71) Applicant: Comcast Cable Communications, LLC, Philadelphia, PA (US)

(72) Inventor: Matthew Robert Ebersviller, Centennial, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 49 days.

(21) Appl. No.: 18/176,895

(22) Filed: Mar. 1, 2023

(65) Prior Publication Data

US 2024/0298041 A1 Sep. 5, 2024

(51) Int. Cl.
*H04N 19/86* (2014.01)
*H04N 19/119* (2014.01)
*H04N 19/154* (2014.01)

(52) U.S. Cl.
CPC ........... *H04N 19/86* (2014.11); *H04N 19/119* (2014.11); *H04N 19/154* (2014.11)

(58) Field of Classification Search
CPC ..... H04N 19/86; H04N 19/119; H04N 19/154
USPC .................................................... 375/240.26
See application file for complete search history.

(56) References Cited

U.S. PATENT DOCUMENTS

| | | | |
|---|---|---|---|
| 7,865,035 B2 | 1/2011 | Lin et al. | |
| 7,940,844 B2 * | 5/2011 | Lai ......................... | H04N 19/51 375/240.24 |
| 7,940,996 B2 | 5/2011 | Crete et al. | |
| 2007/0180106 A1 * | 8/2007 | Pirzada ............... | H04L 43/0888 709/224 |
| 2012/0117225 A1 * | 5/2012 | Kordasiewicz ...... | H04N 17/004 709/224 |
| 2012/0180101 A1 * | 7/2012 | Davis ................. | H04N 21/6118 725/116 |
| 2013/0290492 A1 * | 10/2013 | ElArabawy ......... | H04L 47/2416 709/219 |
| 2013/0298170 A1 * | 11/2013 | ElArabawy ......... | H04L 47/2416 725/62 |

(Continued)

OTHER PUBLICATIONS

Uzair M. et al., "An Efficient No. Reference Blockiness Metric for Intra-Coded Video Frames," Wireless Personal Multimedia Communications (WPMC), 2011 14th Annual International Symposium on, IEEE, 5 pgs.

(Continued)

*Primary Examiner* — Albert Kir
(74) *Attorney, Agent, or Firm* — Ballard Spahr LLP

(57) ABSTRACT

Methods, systems, and apparatuses for detecting blockiness in frames of content are described herein. Frame of content may include blocks of pixels. Blockiness may be perceptible in encoded frames, once decoded, due to encoding-related artifacts and/or other artifacts related to processing and/or delivery of the content. Cumulative differences between neighboring pixel values within a frame on a row-by-row and/or a column-by-column basis may be represented in data, such as a data structure. The data may indicate an amount of blockiness within the frame. When the amount of blockiness is beyond an acceptable level, one or more remedial actions may be performed to lessen an amount of blockiness in other frames of the content.

20 Claims, 11 Drawing Sheets

(56)         References Cited

U.S. PATENT DOCUMENTS

| | | | |
|---|---|---|---|
| 2014/0002670 A1* | 1/2014 | Kolarov .............. | H04N 17/004 |
| | | | 348/180 |
| 2017/0347139 A1* | 11/2017 | Joshi ................ | H04N 21/44209 |

OTHER PUBLICATIONS

European Search Report issued in related application No. EP24160840 mailed May 10, 2024.

* cited by examiner

DETERMINE A PLURALITY OF
PARTITIONS OF A FRAME OF CONTENT

920

GENERATE FIRST DATA ASSOCIATED
WITH THE FRAME OF THE CONTENT

930

GENERATE SECOND STRUCTURE
ASSOCIATED WITH THE FRAME OF THE CONTENT

940

DETERMINE A QUALITY SCORE
FOR THE FRAME OF THE CONTENT

950

CAUSE AT LEAST ONE REMEDIAL ACTION TO BE PERFORMED

1000

1010
DETERMINE A FIRST QUALITY SCORE
FOR A FIRST FRAME OF CONTENT

1020
DETERMINE A SECOND QUALITY SCORE
FOR A SECOND FRAME OF THE CONTENT

1030
CAUSE AT LEAST ONE REMEDIAL ACTION TO BE PERFORMED

1100

1110

DETERMINE A FIRST QUALITY SCORE
FOR A FIRST OUTPUT OF A FRAME OF CONTENT

1120

DETERMINE A SECOND QUALITY SCORE
FOR A SECOND OUTPUT OF THE FRAME OF THE CONTENT

1130

CAUSE AT LEAST ONE REMEDIAL ACTION TO BE PERFORMED

METHODS, SYSTEMS, AND APPARATUSES FOR DETECTING BLOCKINESS IN CONTENT

BACKGROUND

Blockiness, macroblocking, and/or pixelation are common examples of artifacts affecting video quality that may occur when frames of video content are encoded, compressed, processed, delivered, etc. Existing solutions to lessen the amount of perceptible artifacts typically focus on a spatial domain of each frame; however, these existing solutions may be computational cumbersome and suboptimal. These and other considerations are discussed herein.

SUMMARY

It is to be understood that both the following general description and the following detailed description are exemplary and explanatory only and are not restrictive. This summary is not intended to identify critical or essential features of the disclosure, but merely to summarize certain features and variations thereof. Other details and features will be described in the sections that follow.

Methods, systems, and apparatuses for detecting blockiness in frames of content are described herein. A frame of content may include blocks of pixels (e.g., 8×8 pixel blocks, 16×16 pixel blocks, etc.). Blockiness may be perceptible in encoded frames, once decoded, due to encoding-related artifacts and/or other artifacts related to processing and/or delivery of the content. Cumulative differences between neighboring pixel values within a frame on a row-by-row and/or a column-by-column basis may be represented in corresponding data. The data may indicate an amount of blockiness within the frame. When the amount of blockiness is beyond an acceptable level, one or more remedial actions may be performed to lessen an amount of blockiness in frames of the content.

This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of this specification, together with the description, serve to explain the principles of the present methods and systems.

FIG. 2 shows an example frame.

DETAILED DESCRIPTION

Figure 1:
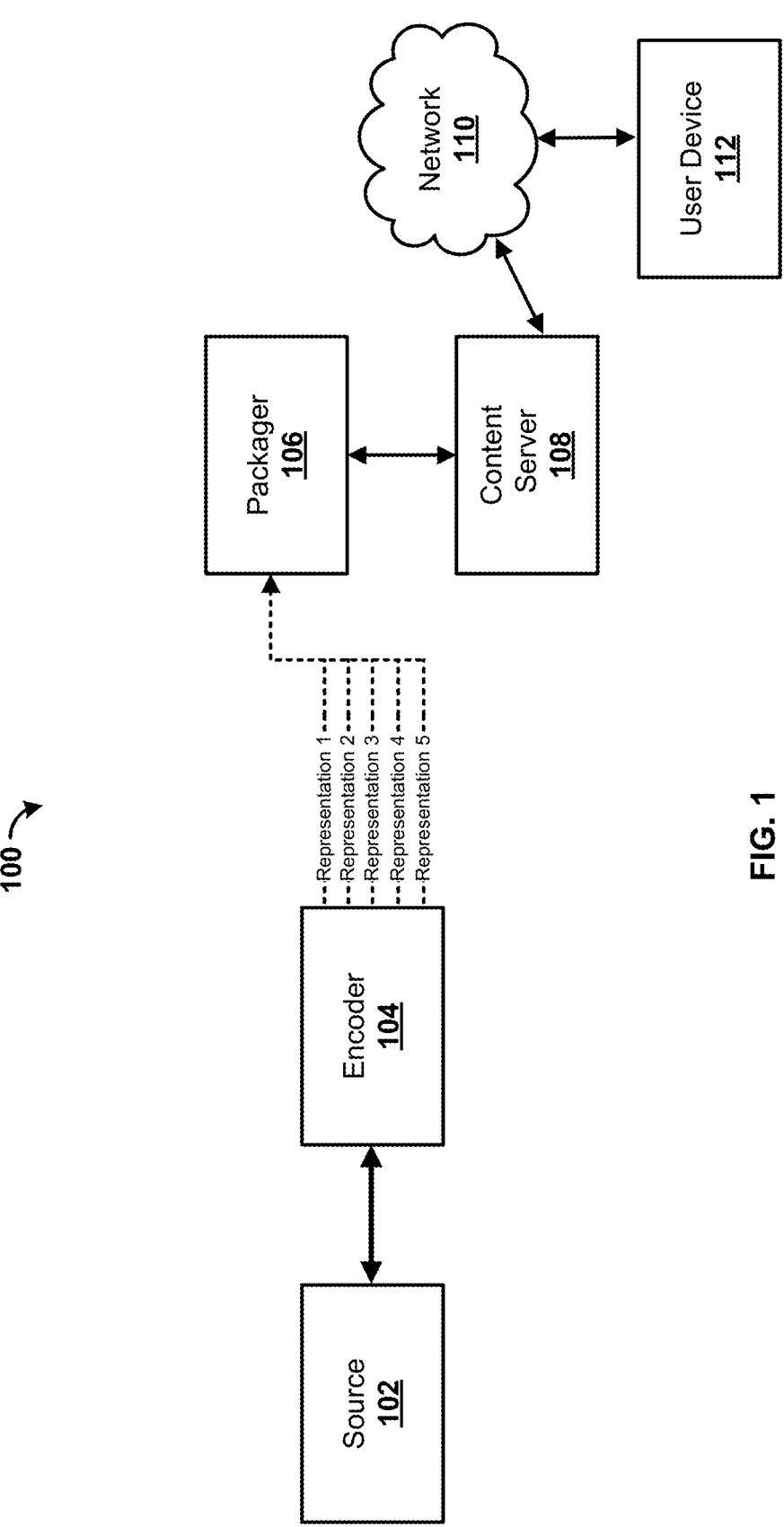
FIG. 1 shows an example system.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers, or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memristors, Non-Volatile Random Access Memory (NVRAM), flash memory, or a combination thereof.

Throughout this application, reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general-purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

"Content," as the term is used herein, may also be referred to as a "content item," "content data," "content information," "content asset," "multimedia asset data file," or simply "data" or "information". Content may be any information or data that may be licensed to one or more individuals (or other entities, such as business or group). Content may be electronic representations of video, audio, text, and/or graphics, which may be but is not limited to electronic representations of videos, movies, or other multimedia, which may be but is not limited to data files adhering to H.264/MPEG-AVC, H.265/MPEG-HEVC, H.266/MPEG-VVC, MPEG-5 EVC, MPEG-5 LCEVC, AV1, MPEG2, MPEG, MPEG4 UHD, SDR, HDR, 4k, Adobe® Flash® Video (.FLV), ITU-T H.261, ITU-T H.262 (MPEG-2 video), ITU-T H.263, ITU-T H.264 (MPEG-4 AVC), ITU-T H.265 (MPEG HEVC), ITU-T H.266 (MPEG VVC), one or more image formats (e.g., JPEG, PNG, GIF, TIFF, BMP, etc.) or some other video or image file format, whether such format is presently known or developed in the future. The content described herein may be electronic representations of music, spoken words, or other audio, which may be but is not limited to data files adhering to MPEG-1 audio, MPEG-2 audio, MPEG-2 and MPEG-4 advanced audio coding, MPEG-H, AC-3 (Dolby Digital), E-AC-3 (Dolby Digital Plus), AC-4, Dolby Atmos®, DTS®, and/or any other format configured to store electronic audio, whether such format is presently known or developed in the future. Content items may be any combination of the above-described formats.

"Consuming content" or the "consumption of content," as those phrases are used herein, may also be referred to as "accessing" content, "providing" content, "viewing" content, "listening" to content, "rendering" content, or "playing" content, among other things. In some cases, the particular term utilized may be dependent on the context in which it is used. Consuming video may also be referred to as viewing or playing the video. Consuming audio may also be referred to as listening to or playing the audio. This detailed description may refer to a given entity performing some action. It should be understood that this language may in some cases mean that a system (e.g., a computer) owned and/or controlled by the given entity is actually performing the action.

FIG. 1 shows an example system 100 for detecting blockiness in frames of content. It should be noted that the terms "frame" and "frames" of content as described herein may relate to a frame or frames of video content as well as an image or images of image content. The system 100 may comprise a plurality of computing devices/entities in communication via a network 110. The network 110 may be an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof. Data may be sent on the network 110 via a variety of transmission paths, including wireless paths (e.g., satellite paths, Wi-Fi paths, cellular paths, etc.) and terrestrial paths (e.g., wired paths, a direct feed source via a direct line, etc.). The network 110 may comprise public networks, private networks, wide area networks (e.g., Internet), local area networks, and/or the like. The network 110 may comprise a content access network, content distribution network, and/or the like. The network 110 may be configured to provide content from a variety of sources using a variety of network paths, protocols, devices, and/or the like. The content delivery network and/or content access network may be managed (e.g., deployed, serviced) by a content provider, a service provider, and/or the like. The network 110 may deliver content items from a source(s) to a user device(s).

The system 100 may comprise a source 102, such as a server or other computing device. The source 102 may receive source streams for a plurality of content items. The source streams may be live streams (e.g., a linear content stream), video-on-demand (VOD) streams, or any other type of content stream. The source 102 may receive the source streams from an external server or device (e.g., a stream capture source, a data storage device, a media server, etc.). The source 102 may receive the source streams via a wired or wireless network connection, such as the network 110 or another network (not shown).

The source 102 may comprise a headend, a video-on-demand server, a cable modem termination system, and/or the like. The source 102 may provide content (e.g., video, audio, games, applications, data) and/or content items (e.g., video, streaming content, movies, shows/programs, etc.) to user devices. The source 102 may provide streaming media, such as live content, on-demand content (e.g., video-on-demand), content recordings, and/or the like. The source 102 may be managed by third-party content providers, service providers, online content providers, over-the-top content providers, and/or the like. A content item may be provided via a subscription, by individual item purchase or rental, and/or the like. The source 102 may be configured to provide content items via the network 110. Content items may be accessed by user devices via applications, such as mobile applications, television applications, set-top box applications, gaming device applications, and/or the like. An application may be a custom application (e.g., by a content provider, for a specific device), a general content browser (e.g., a web browser), an electronic program guide, and/or the like.

The source 102 may provide uncompressed content items, such as raw video data, comprising one or more portions (e.g., frames/slices, groups of pictures (GOP), coding units (CU), coding tree units (CTU), etc.). It should be noted that although a single source 102 is shown in FIG. 1, this is not to be considered limiting. In accordance with the described techniques, the system 100 may comprise a plurality of sources 102, each of which may receive any number of source streams.

The system 100 may comprise an encoder 104, such as a video encoder, a content encoder, etc. The encoder 104 may be configured to encode one or more source streams (e.g., received via the source 102) into a plurality of content items/streams at various bitrates (e.g., various representations). For example, the encoder 104 may be configured to encode a source stream for a content item at varying bitrates for corresponding representations (e.g., versions) of a content item for adaptive bitrate streaming. As shown in FIG. 1, the encoder 104 may encode a source stream into Representations 1-5. It is to be understood that the FIG. 1 shows five representations for explanation purposes only. The encoder 104 may be configured to encode a source stream into fewer or greater representations. Representation 1 may be associated with a first resolution (e.g., 480p) and/or a first bitrate (e.g., 4 Mbps). Representation 2 may be associated with a second resolution (e.g., 720p) and/or a second bitrate (e.g., 5 Mbps). Representation 3 may be associated with a third resolution (e.g., 1080p) and/or a third bitrate (e.g., 6 Mbps). Representation 4 may be associated with a fourth resolution (e.g., 4K) and/or a first bitrate (e.g., 10 Mbps). Representation 5 may be associated with a fifth resolution (e.g., 8K) and/or a fifth bitrate (e.g., 15 Mbps). Other examples resolutions and/or bitrates are possible.

The encoder 104 may be configured to determine one or more encoding parameters. The encoding parameters may be based on one or more content streams encoded by the encoder 104. For example, an encoding parameter may comprise at least one of an encoding quantization level (e.g., a size of coefficient range for grouping coefficients), a predictive frame error, a relative size of an inter-coded frame with respect to an intra-coded frame, a number of motion vectors to encode in a frame, a quantizing step size (e.g., a bit precision), a combination thereof, and/or the like. As another example, an encoding parameter may comprise a value indicating at least one of a low complexity to encode, a medium complexity to encode, or a high complexity to encode. As a further example, an encoding parameter may comprise a transform coefficient(s), a quantization parameter value(s), a motion vector(s), an inter-prediction parameter value(s), an intra-prediction parameter value(s), a motion estimation parameter value(s), a partitioning parameter value(s), a combination thereof, and/or the like. The encoder 104 may be configured to insert encoding parameters into the content streams and/or provide encoding parameters to other devices within the system 100.

Encoding a content stream/item may comprise the encoder 104 partitioning a portion and/or frame of the content stream/item into a plurality of coding tree units (CTUs). Each of the CTUs may comprise a plurality of pixels. The CTUs may be partitioned into coding units (CUs) (e.g., coding blocks). For example, a content item may include a plurality of frames (e.g., a series of frames/pictures/portions, etc.). The plurality of frames may comprise I-frames, P-frames, and/or B-frames. An I-frame (e.g., an Intra-coded picture) may include and/or represent a complete image/picture. A P-frame (e.g., a Predicted picture/delta frame) may comprise only the changes in an image from a previous frame. For example, in a scene where a person moves across a stationary background, only the person's movements need to be encoded in a corresponding P-frame in order to indicate the change in the person's position with respect to the stationary background. To save space and computational resources, the encoder 104 may not store information/data indicating any unchanged background pixels in the P-frame. A B-frame (e.g., a Bidirectional predicted picture) may enable the encoder 104 to save more space and computational resources by storing differences between a current frame and both a preceding and a following frame. Each frame of a content item may be divided into a quantity of partitions. Each partition may comprise a plurality of pixels. Depending on a coding format (e.g., a CODEC), the partition may be a block, a macroblock, a CTU, etc. The order in which I-frames, P-frames, and B-frames are arranged is referred to herein as a Group of Pictures (GOP) structure—or simply a GOP. The encoder 104 may encode frames as open GOPs or as closed GOPs.

While the description herein refers to the encoder 104 encoding entire frames of content, it is to be understood that the functionality of the encoder 104 may equally apply to a portion of a frame rather than an entire frame. A portion of a frame may comprise one or more coding tree units/blocks (CTUs), one or more coding units/blocks (CUs), a combination thereof, and/or the like.

The encoder 104 may vary a bit rate and/or a resolution of encoded content by downsampling and/or upsampling one or more portions of the content. For example, when downsampling, the encoder 104 may lower a sampling rate and/or sample size (e.g., a number of bits per sample) of the content. An encoding parameter as described herein may comprise the sampling rate and/or the sample size used by the encoder 104. The encoder 104 may downsample content to decrease an overall bit rate when sending encoded portions of the content to the content server 108 and or the user device 110. The encoder 104 may downsample, for example, due to limited bandwidth and/or other network/hardware resources. An increase in available bandwidth and/or other network/hardware resources may cause the encoder 104 to upsample one or more portions of the content. For example, when upsampling, the encoder 104 may use a coding standard that permits reference frames (e.g., reference pictures) from a first representation to be resampled (e.g., used as a reference) when encoding another representation. The processes required when downsampling and upsampling by the encoder 104 may be referred to as content-aware encoding techniques as described herein (e.g., adaptive resolution changes, reference picture resampling, etc.).

Some encoding standards, such as the Versatile Video Coding (VVC) codec (e.g., H.266), permit enhanced content-aware encoding techniques referred to herein interchangeably as called adaptive resolution change ("ARC") and/or reference picture resampling ("RPR"). For example, the encoder 104 may utilize ARC to upsample and/or downsample reference pictures in a GOP "on the fly" to improve coding efficiency based on current network conditions and/or hardware conditions/resources. The encoder 104 may downsample for various reasons. For example, the encoder 104 may downsample when the source 102 is no longer able to provide a source stream of the content at a requested resolution (e.g., a requested representation). As another example, the encoder 104 may downsample when network bandwidth is no longer sufficient to timely send content at a requested resolution (e.g., a requested representation) to the user device 112. As another example, the encoder 104 may downsample when a requested resolution (e.g., a requested representation) is not supported by a requesting device (e.g., the user device 112). Further, as discussed herein, the encoder 104 may downsample when the 104 encoder takes longer than an allocated time budget to encode at least a portion of a given frame(s) of requested content item at a requested resolution (e.g., a requested representation).

The encoder 104 may upsample for various reasons. For example, the encoder 104 may upsample when the source 102 becomes able to provide a source stream of the content at a higher resolution (e.g., a representation with a higher bit rate than currently being output). As another example, the encoder 104 may upsample when network bandwidth permits the encoder 104 to timely send content at a higher resolution to the user device 112. As another example, the encoder 104 may upsample when a higher is supported by a requesting device (e.g., the user device 112).

The system 100 may comprise a packager 106. The packager 106 may be configured to receive one or more content items/streams from the encoder 104. The packager 106 may be configured to prepare content items/streams for distribution. For example, the packager 106 may be configured to convert encoded content items/streams into a plurality of content fragments. The packager 106 may be configured to provide content items/streams according to adaptive bitrate streaming. For example, the packager 106 may be configured to convert encoded content items/streams at various representations into one or more adaptive bitrate streaming formats, such as Apple HTTP Live Streaming (HLS), Microsoft Smooth Streaming, Adobe HTTP Dynamic Streaming (HDS), MPEG DASH, and/or the like. The packager 106 may pre-package content items/streams and/or provide packaging in real-time as content items/streams are requested by user devices, such as a user device 112. The user device 112 may be a content/media player, a set-top box, a client device, a smart device, a mobile device, a user device, etc.

The system 100 may comprise a content server 108. For example, the content server 108 may be configured to receive requests for content, such as content items/streams. The content server 108 may identify a location of a requested content item and provide the content item—or a portion thereof—to a device requesting the content, such as the user device 112. The content server 108 may comprise a Hypertext Transfer Protocol (HTTP) Origin server. The content server 108 may be configured to provide a communication session with a requesting device, such as the user device 112, based on HTTP, FTP, or other protocols. The content server 108 may be one of a plurality of content server distributed across the system 100. The content server 108 may be located in a region proximate to the user device 112. A request for a content stream/item from the user device 112 may be directed to the content server 108 (e.g., due to the location and/or network conditions). The content server 108 may be configured to deliver content streams/items to the user device 112 in a specific format requested by the user device 112. The content server 108 may be configured to provide the user device 112 with a manifest file (e.g., or other index file describing portions of the content) corresponding to a content stream/item. The content server 108 may be configured to provide streaming content (e.g., unicast, multicast) to the user device 112. The content server 108 may be configured to provide a file transfer and/or the like to the user device 112. The content server 108 may cache or otherwise store content (e.g., frequently requested content) to enable faster delivery of content items to users.

The content server 108 may receive requests for content items, such as requests for high-resolution videos and/or the like. The content server 108 may receive requests for the content items from the user device 112 and/or other user devices/client devices (not shown in FIG. 1). The content server 108 may send (e.g., to the user device 112) one or more portions of the requested content items at varying bit rates (e.g., representations 1-5). For example, the user device 112 and/or other user devices/client devices may request that the content server 108 send Representation 1 of a content item based on a first set of network conditions (e.g., lower-levels of bandwidth, throughput, etc.). As another example, the user device and/or other user devices/client devices may request that the content server 108 send Representation 5 based on a second set of network conditions (e.g., higherlevels of bandwidth, throughput, etc.). The content server 108 may receive encoded/packaged portions of the requested content item from the encoder 104 and/or the packager 106 and send (e.g., provide, serve, transmit, etc.) the encoded/packaged portions of the requested content item to the user device 112 and/or other user devices/client devices.

The system 100 may adaptively process frames (e.g., images/pictures) of requested content items. For example, one or more devices/entities of the system 100, such as the source 102, the encoder 104, the packager 106, and/or the content server 108, may process, encode, compress, transmit/send, etc., frames of requested content items (or a portion(s) thereof) prior to sending the requested content items (or the portion(s) thereof) to the user device 112 (or another device(s)) for consumption (e.g., output, display, playback, etc.) and/or storage. As a result of being processed, encoded, compressed, transmitted/sent, etc., frames of requested content items (or a portion(s) thereof) may comprise perceptible blockiness (as referred to as "macro-blocking" and "pixelation"). Blockiness in frames may affect an overall quality of experience (QoE) and/or quality of service (QoS) at the user device 112 (and/or the device(s) receiving the frames/content). As further described herein, the system 100 may be configured to determine a quality score for each frame, which may indicate an amount of blockiness the frame. When the quality score for a frame does not satisfy an acceptable level (e.g., when the amount of blockiness affects quality beyond the acceptable level), the system 100 may cause one or more remedial actions to be performed. For example, the system 100 may cause the one or more remedial actions to be performed to lessen an amount of blockiness in other frames when the quality score for the frame does not satisfy (e.g., meet or exceed) the acceptable level.

Figure 2:
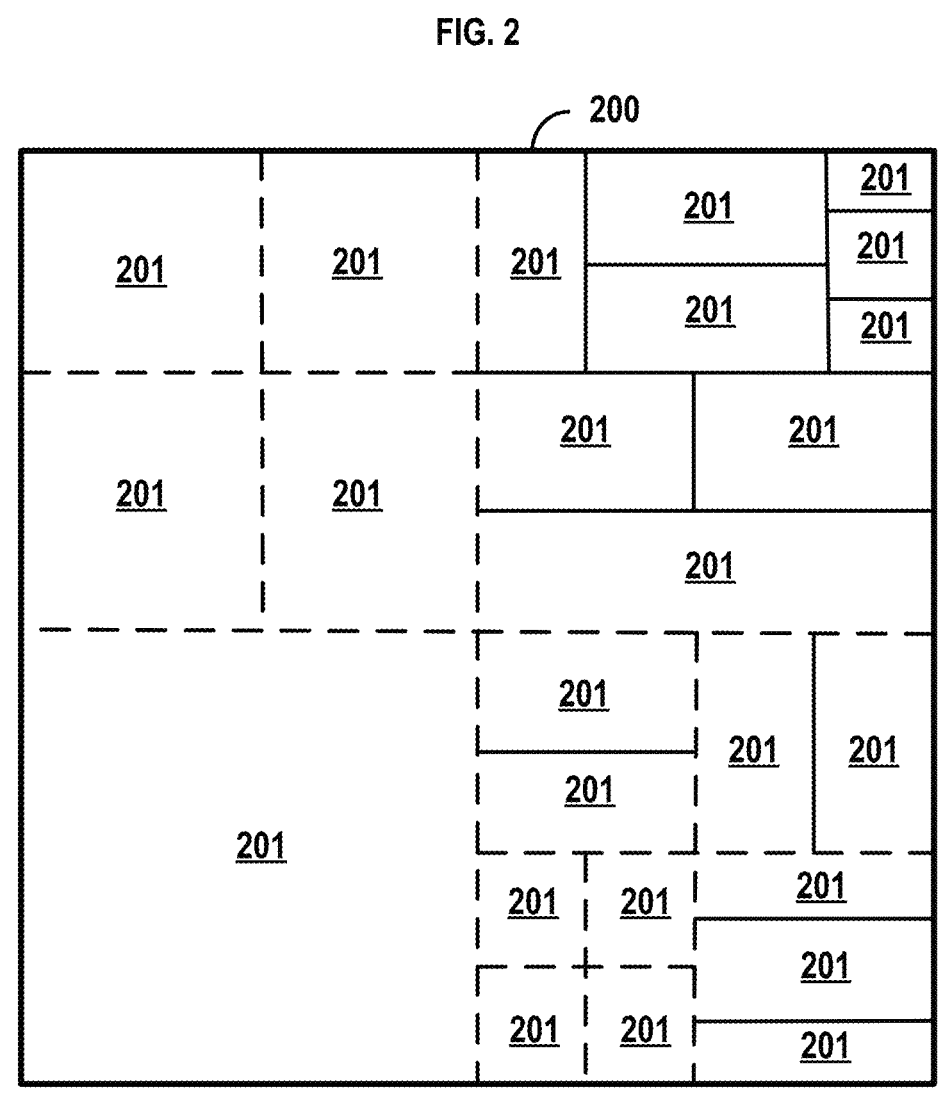

FIG. 2 shows an example frame 200 of a content item that has been divided into a quantity of partitions 201. Each partition 201 may comprise a prediction unit (PU), a coding unit (CU), a coding tree unit (CTU), a combination thereof, and/or the like. For example, depending on the encoding format/standard used by the encoder 104, each partition 201 may be a block, macroblock, coding tree unit, etc. Each partition 201 may comprise a plurality of pixels (e.g., a block of pixels). The plurality of pixels within a partition 201 may comprise a width of X pixels and a height of Y pixels. In some examples, the width, X, and the height, Y, of the plurality of pixels may be the same (e.g., a partition of 8 pixels by 8 pixels; 16 pixels by 16 pixels, etc.), while in other examples they may not be the same. As described herein, as a result of being processed, encoded, compressed, transmitted/sent, etc., by the system 100, partitions 201 of some frames may comprise perceptible blockiness. For example, the encoder 104 may use block-based prediction and transform coding (e.g., H.265/MPEG-HEVC) when encoding frames of content, which may create artifacts/blockiness at partition 201 boundaries.

Figure 3:
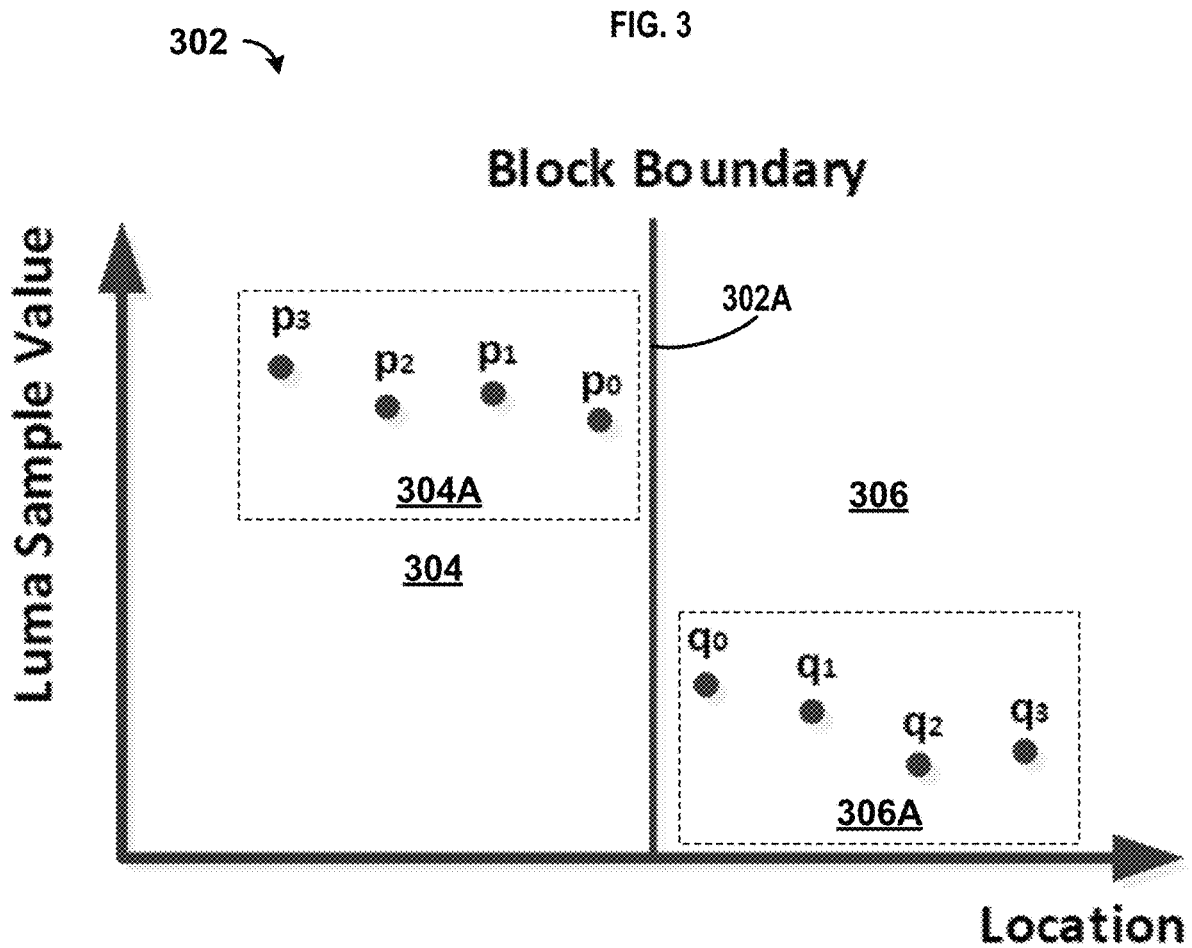
FIG. 3 shows an example chart.

FIG. 3 shows an example chart 302 depicting a block boundary 302A between a first block 304 (e.g., a partition 201) and a second block 306 (e.g., a partition 201) of a frame that includes artifacts/blockiness (not shown). The block boundary 302A shown in FIG. 3 may be one of a plurality of coding block borders. The first block 304 may comprise a first plurality of pixels 304A, and the second block 306 may comprise a second plurality of pixels 306A. Pixels, as described herein, may be indicative of and/or be associated with a pixel value. A pixel value may be, for example, a luma sample value, a chroma sample value, a red/green/blue (RGB) value(s), a combination thereof, and/or the like. There may be variations in pixel values between pixels in the first block 304 and the second block 306. For example, as shown in FIG. 3, the first plurality of pixels 304A (e.g., pixels p0; p1; p2; p3) may each comprise a higher pixel value as compared to the second plurality of pixels 306A (e.g., pixels q0; q1; q2; q3). The block boundary 302A may contain blockiness due to differences in pixel values between the first plurality of pixels 304A and the second plurality of pixels 306A. Perceptible blockiness may have a large impact on overall picture quality, as described herein.

Figure 4:
FIG. 4 shows an example frame.

FIG. 4 shows an example frame 402, such as the frame 200, of a content item. The frame 402 represents an example of a frame of content with very perceptible blockiness as a result of the frame being processed, encoded, compressed, transmitted/sent, etc. As shown in FIG. 4, the frame 402 may comprise perceptible blockiness at point 402A. The point 402A may be an intersection point of a first block boundary (e.g., the block boundary 302A) between a first block (e.g., the first block 304, a partition 201) and a second block (e.g., the second block 306, a partition 201) within the frame 402. The block-like shape present at the point 402A may be perceptible due to differences between pixel values at the border of the first block and the second block.

Figure 5:
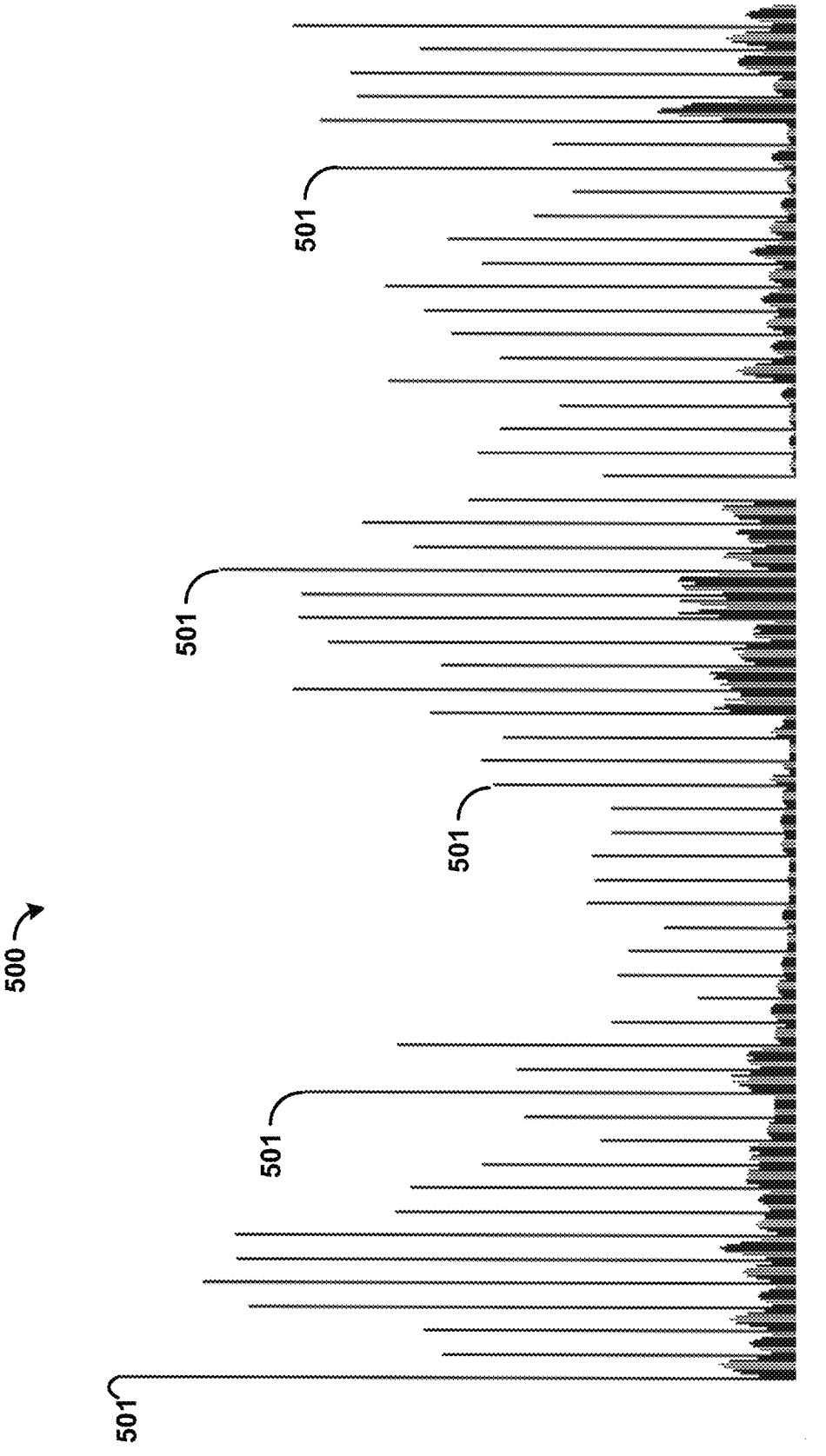
FIG. 5 shows an example graph.

The system 100 (e.g., the encoder 104) may compress or encode frames of content in blocks that are multiples of 8 (e.g., blocks of 8×8 pixels, 16×16 pixels, etc.). As shown in FIG. 2, blocks of pixels may be grouped as partitions 201, and each partition 201 may form "grid lines" occurring at every block border/boundary (e.g., every block of 8×8 pixels, 16×16 pixels, etc.). As further described herein, cumulative differences between neighboring pixel values within a frame, or a partition thereof, may be summed together on a row-by-row and/or a column-by-column basis. The cumulative differences may be determined on an absolute value basis (e.g., as non-negative numbers). The cumulative differences may be represented in data, which may be, or comprise, a data structure, such as a one-dimensional array. The data may indicate an amount of blockiness within the frame and/or partition. The amount of blockiness within the frame and/or partition may spike—relatively speaking—at regular intervals due to the nature of compressing and/or encoding in multiples of 8 pixels. For example, FIG. 5 shows an example graph 500 representing periodicity of the amount of blockiness within a frame of content as spikes 501. As shown in FIG. 5, the spikes 501 may differ in degree/magnitude but may be consistent/regular in occurrence (e.g., every 8 pixels). Due to the consistency/regularity of these spikes 501, the amount of blockiness within frames of content may be analyzed using time-series methodologies, such as seasonality and other pattern-based analysis.

Figures 6A, 6B, 6C:
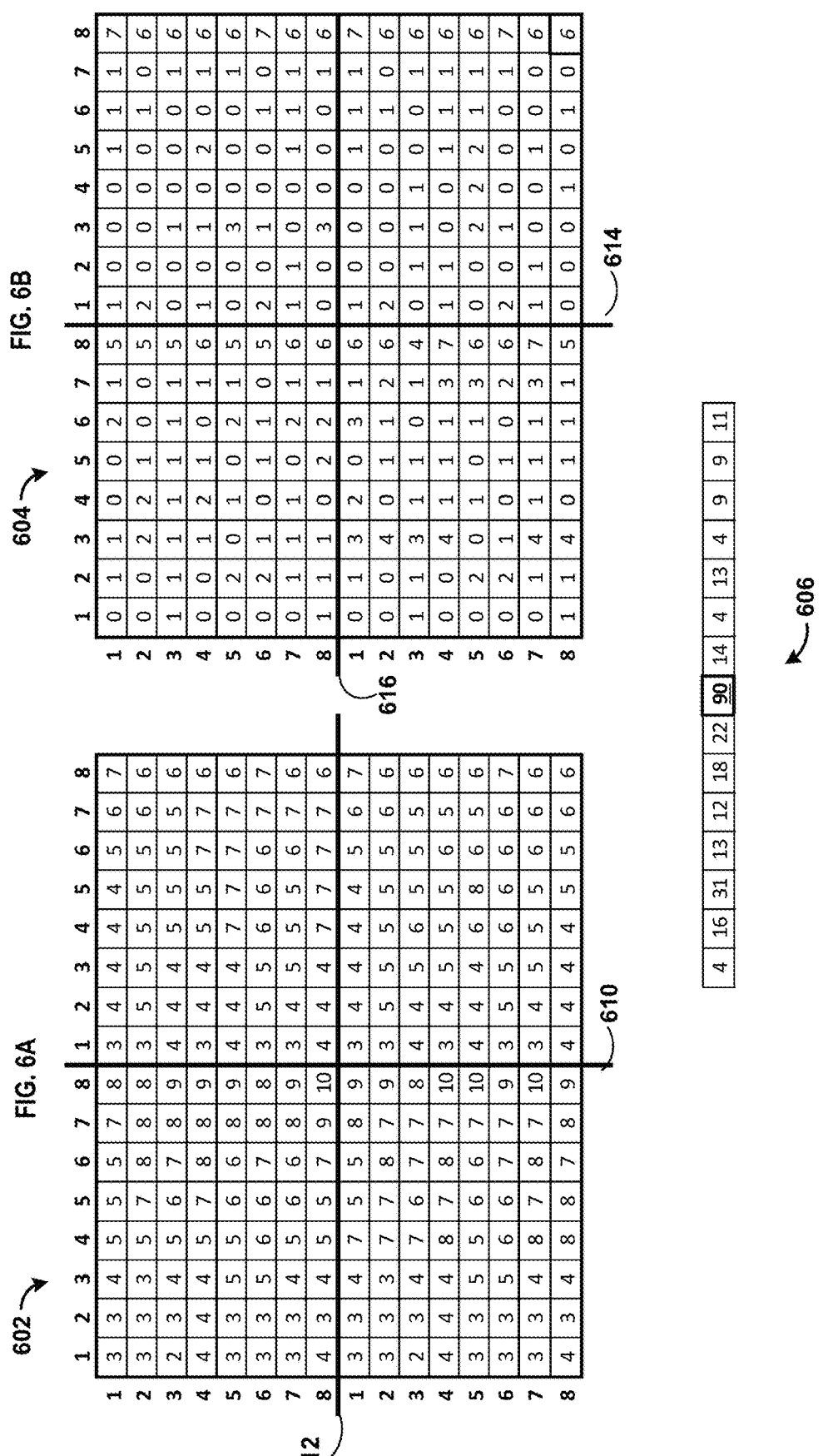
FIG. 6A shows an example grid representation of a frame.
FIG. 6B shows example data.
FIG. 6C shows example data.

FIG. 6A shows an example grid 602 splitting a frame of content (e.g., the frame 200 or the frame 402) into four 8×8 blocks of pixels. The grid 602 may comprise a plurality of non-overlapping blocks, such as four non-overlapping 8×8 pixel blocks as shown in FIG. 6A. It should be noted that, as described herein, the encoder 104 may compress or encode frames of content in blocks of any size, such as blocks of 2×2 pixels, 4×4 pixels, 16×16 pixels . . . N×N pixels, etc. The example described with reference to FIG. 6A (blocks of 8×8 pixels) is meant to be exemplary only, and blocks of 8×8 pixels are described herein for ease of explanation. Each of the four non-overlapping 8×8 pixel blocks shown in FIG. 6A may be a partition of the frame, such as the partitions 201 described herein. Each partition may comprise a plurality of pixels (64 pixels in this 8×8 example). Each coding block border (e.g., boundary) of each partition may comprise a vertical direction and a horizontal direction. FIG. 6A shows an example vertical block boundary 610 (e.g., coding block border/boundary in a vertical direction) between each partition as well as an example horizontal block boundary 612 (e.g., coding block border/boundary in a horizontal direction) between each partition.

As shown in FIG. 6A, each pixel in each partition of the grid 602 may be indicative of and/or be associated with a pixel value. Each pixel value may be, for example, a luma sample value, a chroma sample value, a red/green/blue (RGB) value(s), a combination thereof, and/or the like. For ease of explanation, the pixel values shown in FIG. 6A range between 1 and 10; however, actual pixel values may be less than 1, greater than 10, etc.

The differences between neighboring pixel values in the grid 602 may be determined on a row-by-row basis using an absolute value of each (e.g., a non-negative number). For example, FIG. 6B shows example data 604, represented as a grid similar to the grid 602. The data 604 may be, or comprise, a data structure, such as a two-dimensional array, a two-dimensional matrix, a list, a linked list, a vector, etc. The data 604 may have a vertical block boundary 614 (corresponding to the vertical block boundary 610 of the grid 602) and a horizontal block boundary 616 (corresponding to the horizontal block boundary 612 of the grid 602). The data 604 may represent absolute value differences between neighboring pixel values in the grid 602 on a row-by-row basis. For example, the value of "0" in row 1/column 1 of the data 604 may be determined by subtracting the pixel value at row 1/column 2 in the grid 602 from the pixel value at row 1/column 1 of the first partition in the grid 602 (the absolute value of "3 minus 3" is "0"). This process may be repeated across the row for the partition. As another example, the value of "5" in row 1/column 8 of the first/upper-left partition of the data 604 may be determined by subtracting the pixel value at row 1/column 1 of the second/upper-right partition in the grid 602 from the pixel value at row 1/column 8 of the first/upper-left partition in the grid 602 (the absolute value of "3 minus 8" is "5"). This process may be repeated for each partition. As shown in FIG. 6B, the values in the right-most column of the data 604 (italicized) may correspond to the values in the right-most column of the grid 602 due to pixels corresponding to the right-most column of the grid 602 being a boundary of the overall frame. FIG. 6B includes/shows those values (italicized in the right-most column of the data 604) for exemplary purposes. Because the pixel values corresponding to the right-most column of the grid 602 correspond to a boundary of the overall frame, the values shown in the right-most column of the data 604 may be disregarded or even not determined/not calculated, etc. For example, in practice, the data 604 may comprise a width equal to the width of the frame of content represented by the grid 602 (16) minus 1 (e.g., 16-1=15 values wide/long).

FIG. 6C shows example data 606. The data 606 may be, or comprise, a data structure, such as a one-dimensional array, a one-dimensional matrix, a list, a linked list, a vector, etc. The data 606 may represent cumulative differences between the pixel values shown in FIG. 6A on a row-by-row basis. For example, the value of "4" at the first position of the data 606 may be determined by summing the values in the first column of the data 604 ("0+0+1+0+0+0+1+0+0+1+0+0+0+0+1" is "4"). This process may be repeated across the columns of the data 604. For example, the value of "90" at the eighth position of the data 606 may be determined by summing the values in the eighth column of the data 604 ("5+5+5+6+5+5+6+6+6+6+4+7+6+6+7+5" is "90").

The data 606 may indicate an amount of blockiness within the frame corresponding to the grid 602. As shown in FIG. 6C, the eighth value in the data 606 may be significantly higher than the first seven values in the data 606, which may indicate a portion(s) of the frame corresponding to the grid 602 is particularly blocky (e.g., perceptible blockiness/pixelation is present). The presence of a significantly higher value at the eighth position, relatively speaking, in the data 606 may represent a periodicity, similar to the spikes 501 at every eighth value in the graph 500.

The data 606 may be used by the system 100 (e.g., any device/entity shown) to determine a quality score for the corresponding frame and/or content overall. For example, the eighth value in the data 606 may equal "90", and the quality score for the frame corresponding to the grid 602 may be "90". Other examples are possible as well, such as using one or more averages of one or more values in the data 606; a weighted average of one or more values in the data 606; a standard deviation of a particular value in the data 606 (e.g., the value of "90" in the eighth position) with respect to one or more other values in the data 606, a z-score based on one or more values in the data 606, a combination thereof, and/or the like. Additionally, or in the alternative, the value of "90", or any other derived value described, may be used as a value, coefficient, etc., in a QoE or QoS score that serves as the "quality score" as that term is used herein. For example, "90" may be one value or coefficient in a QoE or QoS evaluation that considers other aspects of the frame and/or content, as those skilled in the art may appreciate, to determine the quality score. Furthermore, it is to be understood that the eighth value in the data 606 may be used to determine the quality score (or input into a QoE or QoS evaluation/scoring) due to the frame corresponding to the grid 602 being encoded in multiples of 8 pixels. In other examples, such as when the frame is encoded in 16×16 pixel blocks, the 16$^{th}$ value could be used. As noted above, the example described with reference to FIGS. 6A-6C is for a frame of content (e.g., the frame 200 or the frame 402) encoded in four 8×8 blocks of pixels. In practice, the frame of content may be much larger and have a width of, for example, 1080×1080 pixels, in which case the data 606 may have a width (e.g., array length) of 1,079 values (e.g., 1080-1).

As described herein, cumulative differences between neighboring pixel values within a frame, or a partition thereof, may be summed together on a row-by-row and/or a column-by-column basis. The description herein of FIGS. 6A-6C concern the row-by-row approach, while the description that follows regarding FIGS. 7A-7C concern the column-by-column approach.

Figures 7A, 7B, 7C:
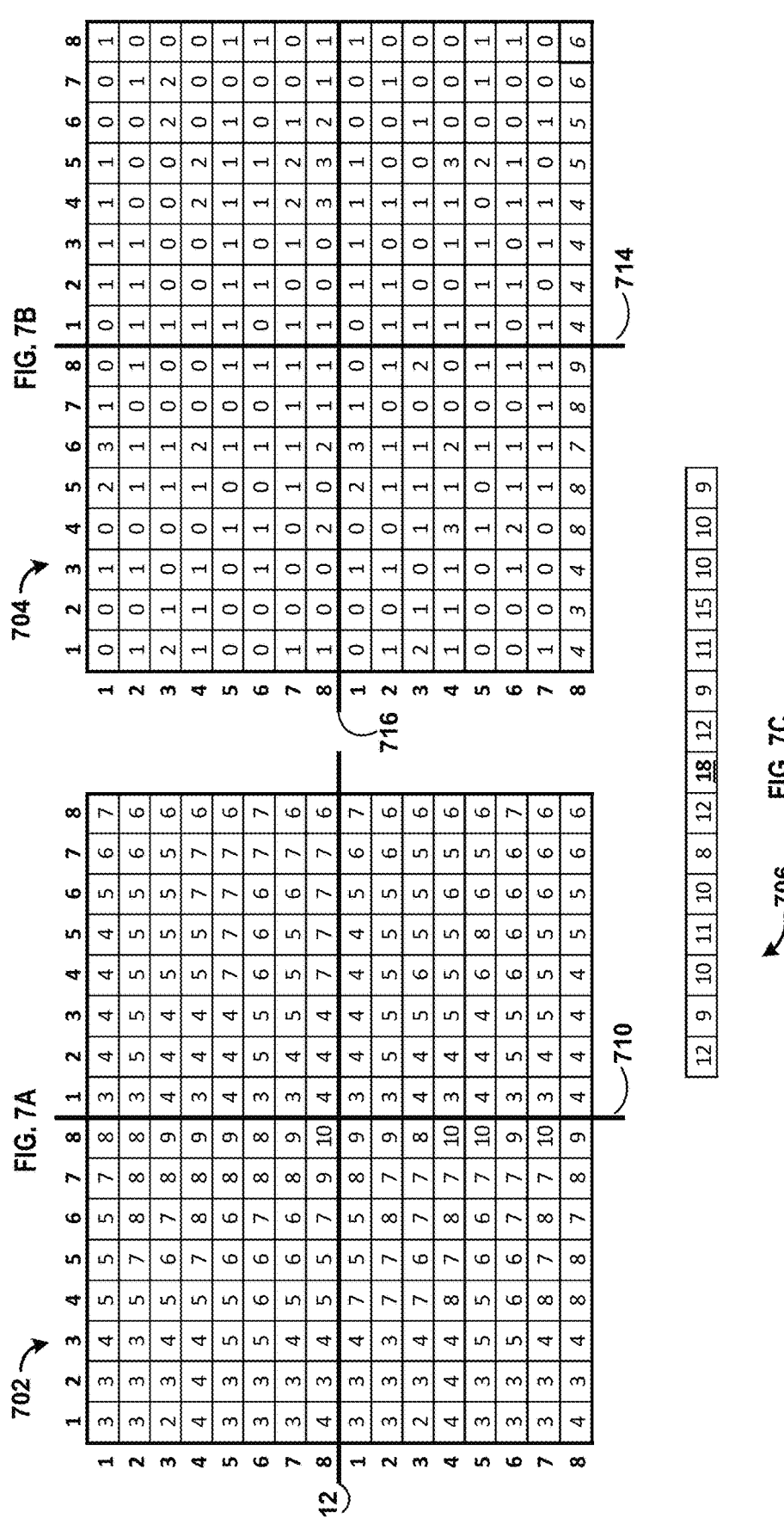
FIG. 7A shows an example grid representation of a frame.
FIG. 7B shows example data.
FIG. 7C shows example data.

FIG. 7A shows an example grid 702 splitting a frame of content (e.g., the frame 200 or the frame 402) into four 8×8 blocks of pixels. The grid 702 may comprise a plurality of non-overlapping blocks, such as four non-overlapping 8×8 pixel blocks as shown in FIG. 7A. It should be noted that, as described herein, the encoder 104 may compress or encode frames of content in blocks of any size, such as blocks of 2×2 pixels, 4×4 pixels, 16×16 pixels . . . N×N pixels, etc. The example described with reference to FIG. 7A (blocks of 8×8 pixels) is meant to be exemplary only, and blocks of 8×8 pixels are described herein for ease of explanation. Each of the four non-overlapping 8×8 pixel blocks shown in FIG. 7A may be a partition of the frame, such as the partitions 201 described herein. Each partition may comprise a plurality of pixels (e.g., 64 pixels in this 8×8 example). Each coding block border (e.g., boundary) of each partition may comprise a vertical direction and a horizontal direction. FIG. 7A shows an example vertical block boundary 710 (e.g., coding block border/boundary in a vertical direction) between each partition as well as an example horizontal block boundary 712 (e.g., coding block border/boundary in a horizontal direction) between each partition.

As shown in FIG. 7A, each pixel in each partition of the grid 702 may be indicative of and/or be associated with a pixel value. For purposes of explanation, the pixel values in the grid 702 correspond to the pixel values of the grid 602. Each pixel value may be, for example, a luma sample value, a chroma sample value, a red/green/blue (RGB) value(s), a combination thereof, and/or the like. For ease of explanation, the pixel values shown in FIG. 7A range between 1 and 10; however, actual pixel values may be less than 1, greater than 10, etc.

The differences between neighboring pixel values in the grid 702 may be determined on a column-by-column basis using an absolute value of each (e.g., a non-negative number). For example, FIG. 7B shows example data 704, represented as a grid similar to the grid 702. The data 704 may be, or comprise, a data structure, such as a two-dimensional array, a two-dimensional matrix, a list, a linked list, a vector, etc. The data 704 may have a vertical block boundary 714 (corresponding to the vertical block boundary 710 of the grid 702) and a horizontal block boundary 716 (corresponding to the horizontal block boundary 712 of the grid 702). The data 704 may represent absolute value differences between neighboring pixel values in the grid 702 on a column-by-column basis. For example, the value of "0" in row 1/column 1 of the data 704 may be determined by subtracting the pixel value at row 2/column 1 in the grid 702 from the pixel value at row 1/column 1 of the first partition in the grid 702 (the absolute value of "3 minus 3" is "0"). This process may be repeated across the column for the partition. As another example, the value of "1" in row 8/column 1 of the first/upper-left partition of the data 704 may be determined by subtracting the pixel value at row 1/column 1 of the third/lower-left partition in the grid 702 from the pixel value at row 8/column 1 of the first/upper-left partition in the grid 702 (the absolute value of "3 minus 4" is "1"). This process may be repeated for each partition. As shown in FIG. 7B, the values in the bottom-most row of the data 704 (italicized) may correspond to the values in the bottom-most row of the grid 702 due to pixels corresponding to the bottom-most row of the grid 602 being a boundary of the overall frame. FIG. 7B includes/shows those values (italicized in the bottom-most row of the data 704) for exemplary purposes. Because the pixel values corresponding to the bottom-most row of the grid 702 correspond to a boundary of the overall frame, the values shown in the bottom-most row of the data 704 may be disregarded or even not determined/not calculated, etc. For example, in practice, the data 704 may comprise a width equal to the width of the frame of content represented by the grid 702 (16) minus 1 (e.g., 16-1=15 values wide/long).

FIG. 7C shows example data 706. The data 706 may be, or comprise, a data structure, such as a one-dimensional array, a one-dimensional matrix, a list, a linked list, a vector, etc. The data 706 may represent cumulative differences between the pixel values shown in FIG. 7A on a column-by-column basis. For example, the value of "12" at the first position of the data 706 may be determined by summing the values in the first row of the data 704 ("0+0+1+0+2+3+1+ 0+0+1+1+1+1+0+0+1" is "12"). This process may be repeated across the rows of the data 704. For example, the value of "18" at the eighth position of the data 706 may be determined by summing the values in the eighth row of the data 704 ("1+0+0+2+0+2+1+1+1+0+0+3+3+2+1+1" is "18").

The data 706 may indicate an amount of blockiness within the frame corresponding to the grid 702. As shown in FIG. 7C, the eighth value in the data 706 may be significantly higher than the first seven values in the data 706, which may indicate a portion(s) of the frame corresponding to the grid 702 is particularly blocky (e.g., perceptible blockiness/pixelation is present). The presence of a significantly higher value at the eighth position, relatively speaking, in the data 706 may represent a periodicity, similar to the spikes 501 at every eighth value in the graph 500.

The data 706 may be used by the system 100 (e.g., any device/entity shown) to determine a quality score for the corresponding frame and/or content overall. For example, the eighth value in the data 706 may equal "18"), and the quality score for the frame corresponding to the grid 702 may be "18". Other examples are possible as well, such as using one or more averages of one or more values in the data 706; a weighted average of one or more values in the data 706; a standard deviation of a particular value in the data 706 (e.g., the value of "18" in the eighth position) with respect to one or more other values in the data 706, a z-score based on one or more values in the data 706, a combination thereof, and/or the like. Additionally, or in the alternative, the value of "18", or any other derived value described, may be used as a value, coefficient, etc., in a QoE or QoS score that serves as the "quality score" as that term is used herein. For example, "18" may be one value or coefficient in a QoE or QoS evaluation that considers other aspects of the frame and/or content, as those skilled in the art may appreciate, to determine the quality score. Furthermore, it is to be understood that every eighth value in the data 706 may be used to determine the quality score (or input into a QoE or QoS evaluation/scoring) due to the frame corresponding to the grid 702 being encoded in multiples of 8 pixels. In other examples, such as when the frame is encoded in 16×16 pixel blocks, the $16^{th}$ value could be used. As noted above, the example described with reference to FIGS. 7A-7C is for a frame of content (e.g., the frame 200 or the frame 402) encoded in four 8×8 blocks of pixels. In practice, the frame of content may be much larger and have a width of, for example, 1080×1080 pixels, in which case the data 706 may have a width (e.g., array length) of 1,079 values (e.g., 1080−1).

The quality scores described herein may indicate an amount of perceptible blockiness associated with the corresponding frame/content. A quality score for a frame/content may be determined by one or more upstream devices in the system 100, such as the source 102, the encoder 104, the packager 106, or the content server 108. Additionally, or in the alternative, one or more downstream devices in the system 100 may determine the quality score, such as the user device 112. The quality score may be determined based on a triggering event. For example, a triggering event may be an amount of time (e.g., a set interval of time), a quantity of encoded or received frames of content; a quantity of encoded or received chunks of content; a quantity of encoded or received fragments of content; a quantity of encoded or received segments of the content; a combination thereof, and/or the like.

When a quality score satisfies (e.g., meets or exceeds) a quality threshold, the system 100 may perform one or more remedial actions to lessen the amount of blockiness in other frames of the content. A quality threshold may be a set value, a range of values, etc. Examples of remedial actions may include an adjustment to any of the encoding parameters described herein; an adjustment to one or more decoding parameters; requesting or retrieving a different quality level/representation of the corresponding content (e.g., a different bitrate); requesting an alternative source of the content; an application of one or more filters (e.g., a Lanczos filter(s), a Gaussian filter(s), a bilateral filter(s), mean filter(s), etc.), a combination thereof, and/or the like.

Figure 8:
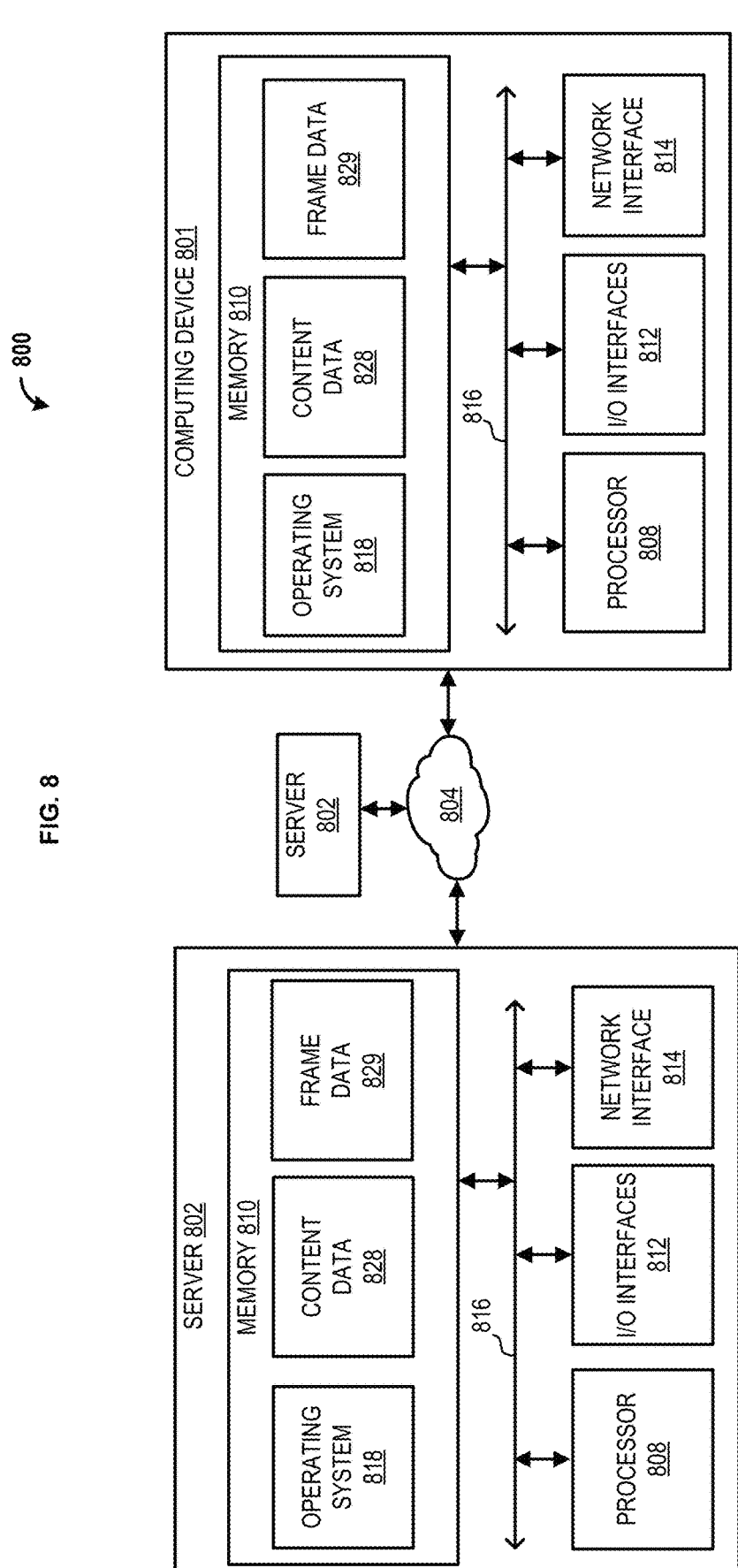
FIG. 8 shows an example system.

The present methods and systems may be computer-implemented. FIG. 8 shows a block diagram depicting a system/environment 800 comprising non-limiting examples of a computing device 801 and a server 802 connected through a network 804. Either of the computing device 801 or the server 802 may be a computing device, such as any of the devices of the system 100 shown in FIG. 1. In an aspect, some or all steps of any described method may be performed on a computing device as described herein. The computing device 801 may comprise one or multiple computers configured to store frame data 829 (e.g., encoding parameters, pixel values, data structures, arrays, messages, etc., as described herein, etc.), and/or the like. The server 802 may comprise one or multiple computers configured to store content data 828 (e.g., frames of content, content fragments, content segments, etc., as described herein). Multiple servers 802 may communicate with the computing device 801 via the through the network 804.

The computing device 801 and the server 802 may be a computer that, in terms of hardware architecture, generally includes a processor 808, system memory 810, input/output (I/O) interfaces 812, and network interfaces 814. These components (808, 810, 812, and 814) are communicatively coupled via a local interface 816. The local interface 816 may be, for example, but not limited to, one or more buses or other wired or wireless connections, as is known in the art. The local interface 816 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 808 may be a hardware device for executing software, particularly that stored in system memory 810. The processor 808 may be any custom made or commercially available processor, a central processing unit (CPU), an auxiliary processor among several processors associated with the computing device 801 and the server 802, a semiconductor-based microprocessor (in the form of a microchip or chip set), or generally any device for executing software instructions. When the computing device 801 and/or the server 802 is in operation, the processor 808 may execute software stored within the system memory 810, to communicate data to and from the system memory 810, and to generally control operations of the computing device 801 and the server 802 pursuant to the software.

The I/O interfaces 812 may be used to receive user input from, and/or for providing system output to, one or more devices or components. User input may be provided via, for example, a keyboard and/or a mouse. System output may be provided via a display device and a printer (not shown). I/O interfaces 812 may include, for example, a serial port, a parallel port, a Small Computer System Interface (SCSI), an infrared (IR) interface, a radio frequency (RF) interface, and/or a universal serial bus (USB) interface.

The network interface 814 may be used to transmit and receive from the computing device 801 and/or the server 802 on the network 804. The network interface 814 may include, for example, a 10BaseT Ethernet Adaptor, a 10BaseT Ethernet Adaptor, a LAN PHY Ethernet Adaptor, a Token Ring Adaptor, a wireless network adapter (e.g., WiFi, cellular, satellite), or any other suitable network interface device. The network interface 814 may include address, control, and/or data connections to enable appropriate communications on the network 804.

The system memory 810 may include any one or combination of volatile memory elements (e.g., random access memory (RAM, such as DRAM, SRAM, SDRAM, etc.)) and nonvolatile memory elements (e.g., ROM, hard drive, tape, CDROM, DVDROM, etc.). Moreover, the system memory 810 may incorporate electronic, magnetic, optical, and/or other types of storage media. Note that the system memory 810 may have a distributed architecture, where various components are situated remote from one another, but may be accessed by the processor 808.

The software in system memory 810 may include one or more software programs, each of which comprises an ordered listing of executable instructions for implementing logical functions. In the example of FIG. 8, the software in the system memory 810 of the computing device 801 may comprise the frame data 829, the content data 828, and a suitable operating system (O/S) 818. In the example of FIG. 8, the software in the system memory 810 of the server 802 may comprise the frame data 829, the content data 828, and a suitable operating system (O/S) 818. The operating system 818 essentially controls the execution of other computer programs and provides scheduling, input-output control, file and data management, memory management, and communication control and related services.

For purposes of illustration, application programs and other executable program components such as the operating system 818 are shown herein as discrete blocks, although it is recognized that such programs and components may reside at various times in different storage components of the computing device 801 and/or the server 802. An implementation of the system/environment 800 may be stored on or transmitted across some form of computer readable media. Any of the disclosed methods may be performed by computer readable instructions embodied on computer readable media. Computer readable media may be any available media that may be accessed by a computer. By way of example and not meant to be limiting, computer readable media may comprise "computer storage media" and "communications media." "Computer storage media" may comprise volatile and non-volatile, removable and non-removable media implemented in any methods or technology for storage of information such as computer readable instructions, data structures, program modules, or other data. Exemplary computer storage media may comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

Figure 9:
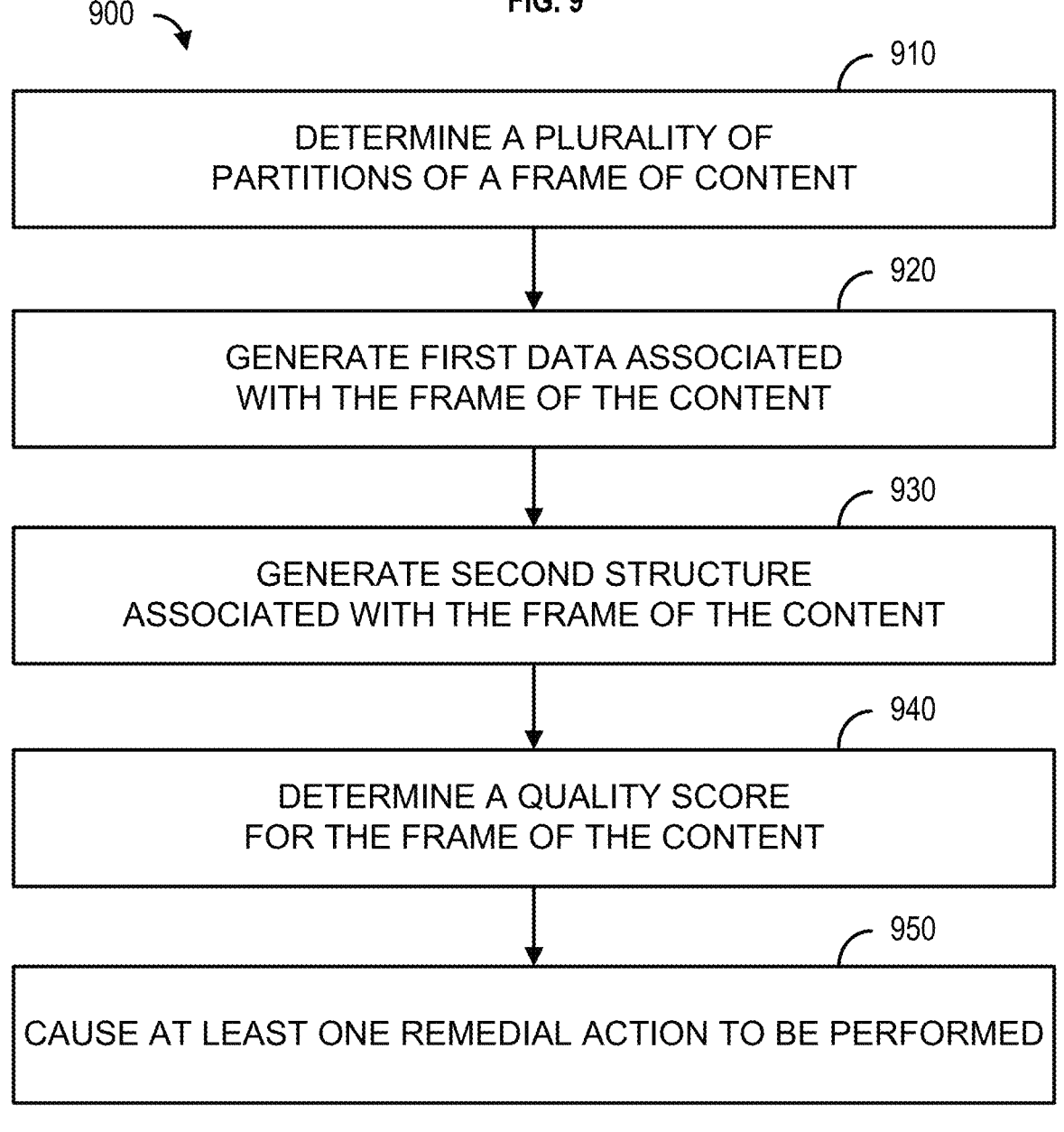
FIG. 9 shows a flowchart for an example method.

FIG. 9 shows a flowchart of an example method 900 for detecting blockiness in frames of content. The method 900 may be performed in whole or in part by a single computing device, a plurality of computing devices, and the like. For example, the steps of the method 900 may be performed by the encoder 104, the packager 106, the content server 108, or the user device 112 shown in FIG. 1 and/or a computing device in communication with any of the aforementioned devices/entities. Some steps of the method 900 may be performed by a first computing device, while other steps of the method 900 may be performed by a second computing device.

At step 910, a computing device may determine a plurality of partitions of a frame of content, such as the frame 200 of the frame 300. Each partition of the plurality of partitions may comprise a plurality of pixels, such as the pixels within each of the partitions 201 described herein. At step 920, the computing device may generate first data associated with the frame of the content. The first data may indicate row-based differences or column-based differences between values of neighboring pixels of the plurality of pixels for each partition. The first data may comprise, as an example, a two-dimensional array or any other suitable data comprising a quantity of values corresponding to a quantity of pixels within the frame.

At step 930, the computing device may generate second data associated with the frame of the content. For example, the computing device may generate the second data based on the first data. The second data may indicate a row-based summation or a column-based summation of the differences between values of neighboring pixels of the plurality of pixels for each partition. The second data may comprise, for example, a data structure such as a one-dimensional array. Other examples are possible as well, such as a matrix, a list, a linked list, a vector, etc. The second data may comprise a quantity of values (e.g., 15) corresponding to (e.g., based on) a pixel width of the frame of content (e.g., 16 pixels) minus 1 (e.g., $16-1=15$).

At step 940, the computing device may determine a quality score for the frame of the content. For example, the computing device may determine the quality score based on the second data content. The quality score may be indicative of an amount of perceptible blockiness within the frame. At step 950, the computing device may cause at least one remedial action (e.g., associated with the frame of the content) to be performed. For example, the computing device may cause the at least one remedial action to be performed based on the quality score satisfying (e.g., meeting or exceeding) a quality threshold. The computing device may comprise a downstream device, such as the user device 112. Causing the at least one remedial action to be performed may comprise the downstream device sending the quality score to an upstream device, and the upstream device may perform the at least one remedial action. As another example, the downstream device may send an indication that the quality score satisfies (e.g., meets or exceeds) the quality threshold to the upstream device, and the upstream device may perform the at least one remedial action. Additionally, or in the alternative, the at least one remedial action may be an adjustment to a decoding parameter; a request for the content from an alternative source; a request for one or more portions of the content at a quality level that differs from a quality level associated with the frame, etc. In some examples, the computing device may comprise an upstream device, such as the encoder 104. Causing the at least one remedial action to be performed may comprise the upstream device sending one or more portions of the content at a quality level that differs from a quality level associated with the frame to a user device. Additionally, or in the alternative, the at least one remedial action may be an adjustment to at least one encoding parameter; determining an alternative source for the content, etc.

Figure 10:
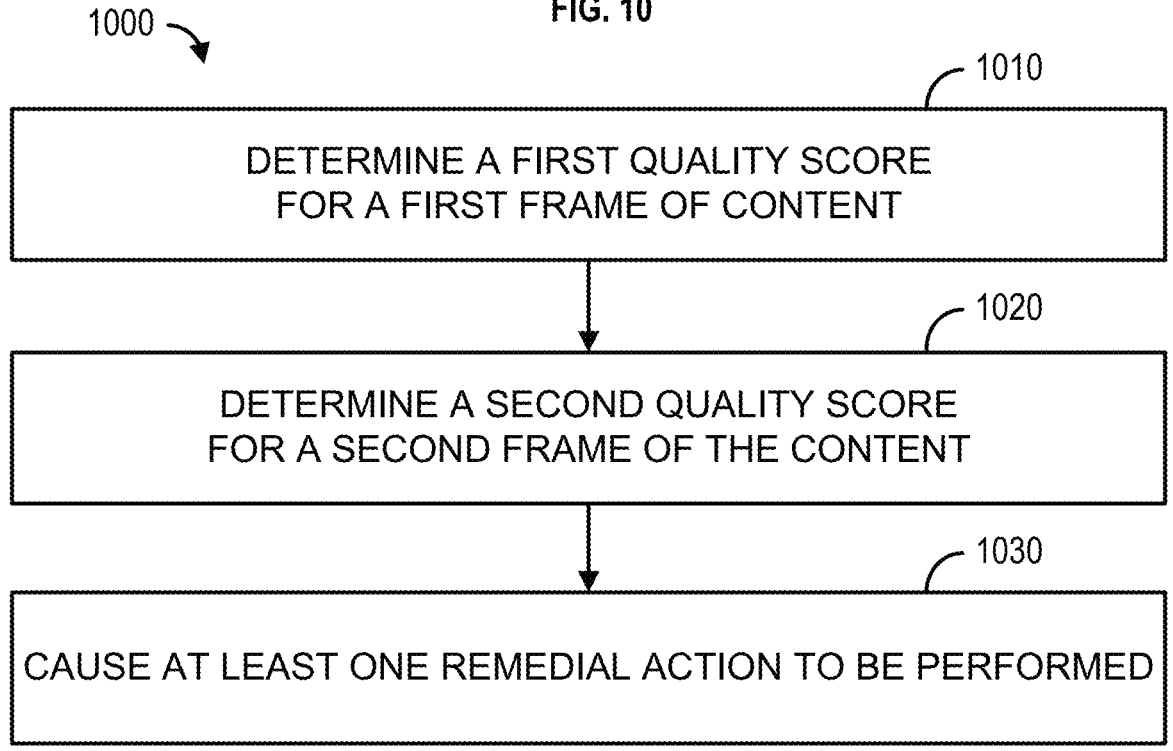
FIG. 10 shows a flowchart for an example method.

FIG. 10 shows a flowchart of an example method 1000 for detecting blockiness in frames of content. The method 1000 may be performed in whole or in part by a single computing device, a plurality of computing devices, and the like. For example, the steps of the method 1000 may be performed by the encoder 104, the packager 106, the content server 108, or the user device 112 shown in FIG. 1 and/or a computing device in communication with any of the aforementioned devices/entities. Some steps of the method 1000 may be performed by a first computing device, while other steps of the method 1000 may be performed by a second computing device.

At step 1010, a computing device may determine a first quality score for a first frame on content. For example, the computing device may determine the first quality score based on a plurality of partitions of the first frame. The first quality score may be indicative of row-based or column-based differences between pixel values within each partition of the plurality of partitions of the first frame. The first quality score may be indicative of an amount of perceptible blockiness within the first frame.

At step 1020, the computing device may determine a second quality score for a second frame of the content. The second quality score may be based on a plurality of partitions of the second frame of the content. The second quality score may be indicative of row-based or column-based differences between pixel values within each partition of a plurality of partitions of the second frame. The second quality score may be indicative of an amount of perceptible blockiness within the second frame.

The computing device may determine the second quality score based on a triggering event. The triggering event may comprise one or more of: an amount of time; a quantity of received frames of the content; a quantity of received chunks of the content; a quantity of received fragments of the content; a quantity of received segments of the content; a combination thereof, and/or the like.

At step 1030, the computing device may cause at least one remedial action (e.g., associated with the first frame and/or the second frame of the content) to be performed. The computing device may cause the at least one remedial action to be performed based on at least one of the first quality score or the second quality score. For example, the computing device may determine, based on at least one of the first quality score or the second quality score, that an amount of perceptible blockiness associated with the content satisfies (e.g., meets or exceeds) a quality threshold. The computing device may comprise a user device, and causing the at least one remedial action to be performed may comprise the user device sending, to an upstream device, an indication of at least one of the first quality score or the second quality score, and the upstream device may perform the at least one remedial action. Additionally, or in the alternative, the at requesting an alternative source for the content; requesting one or more portions of the content at a quality level that differs from a quality level associated with the first frame and the second frame, etc. The computing device may comprise an upstream device, and causing the at least one remedial action to be performed may comprises at least one of: sending, to a user device, one or more portions of the content at a quality level that differs from a quality level associated with the frame; causing at least one encoding parameter to be adjusted; determining an alternative source for the content, etc.

Figure 11:
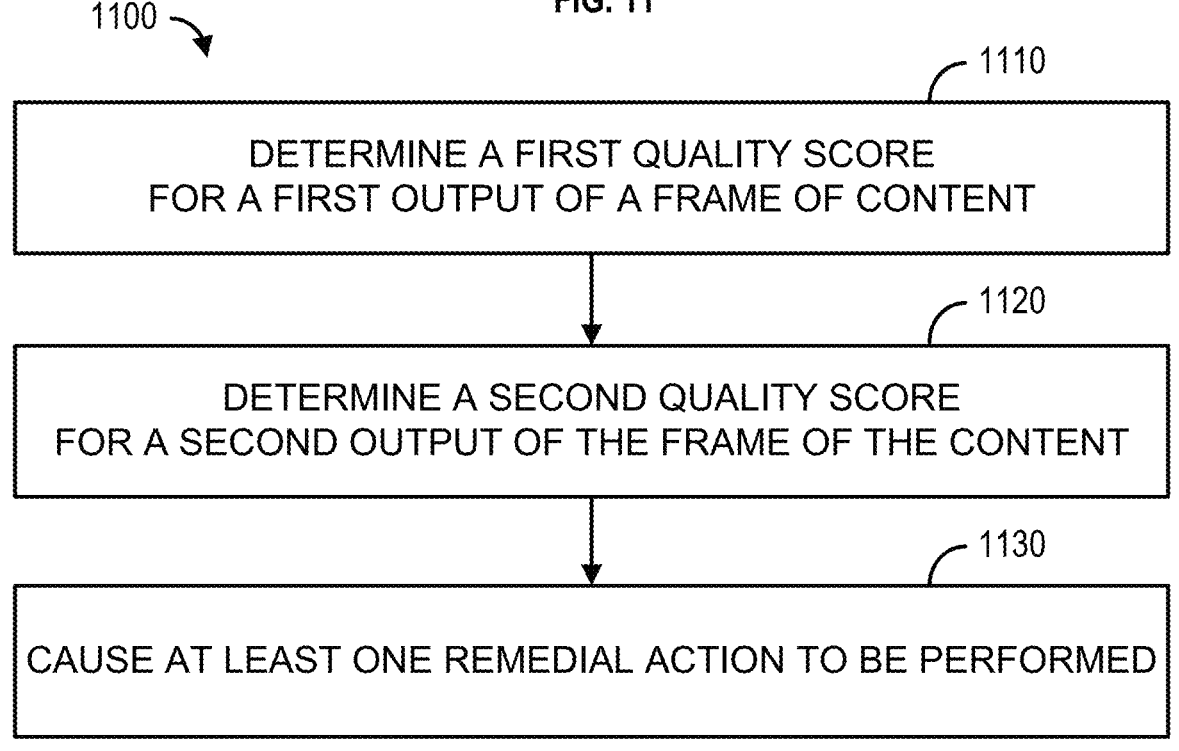
FIG. 11 shows a flowchart for an example method.

FIG. 11 shows a flowchart of an example method 1100 for detecting blockiness in frames of content. The method 1100 may be performed in whole or in part by a single computing device, a plurality of computing devices, and the like. For example, the steps of the method 1100 may be performed by the encoder 104, the packager 106, the content server 108, or the user device 112 shown in FIG. 1 and/or a computing device in communication with any of the aforementioned devices/entities. Some steps of the method 1100 may be performed by a first computing device, while other steps of the method 1100 may be performed by a second computing device.

At step 1110, a computing device may determine a first quality score for a first output of a frame of content by the first computing device. For example, the computing device may generate, as an example, a two-dimensional array, or any other suitable data, indicating differences between pixel values within each partition of a plurality of partitions of the first output of the frame. The computing device may generate a one-dimensional array, or any other suitable data, based on the two-dimensional array. The one-dimensional array may indicate a summation (row-based or column-based) of the differences between the pixel values within each partition of the plurality of partitions of the first output of the frame. The computing device may determine the first quality score based on the one-dimensional array. The first quality score may be indicative of row-based or column-based differences between pixel values within the first output by the first computing device. The first computing device may comprise an encoder, and the first output may comprise the frame of the content encoded by the encoder. The first quality score may be indicative of an amount of perceptible blockiness within the frame of the content encoded by the encoder.

The first computing device may be one of a plurality of computing device. At step 1120, a second computing device of the plurality of computing devices may determine a second quality score. The second quality score may be associated with a second output of the frame by the second computing device. The second quality score may be indicative of row-based or column-based differences between pixel values within the second output by the second computing device. The second computing device may comprise a user device, and the second output may comprise the frame of the content decoded by the user device. The second quality score may be indicative of an amount of perceptible blockiness within the frame of the content decoded by the user device.

At step 1130, at least one remedial action may be caused to be performed. For example, the at least one remedial action may be caused to be performed based on the first quality score and/or the second quality score, which may indicate that an amount of perceptible blockiness associated with the content satisfies (e.g., meets or exceeds) a quality threshold. The at least one remedial action may be performed by the first computing device or the second computing device. Causing the at least one remedial action to be performed may comprise at least one of: sending one or more portions of the content at a quality level that differs from a quality level associated with the frame; causing at least one encoding parameter to be adjusted; causing at least one decoding parameter to be adjusted; determining an alternative source for the content, etc.

While specific configurations have been described, it is not intended that the scope be limited to the particular configurations set forth, as the configurations herein are intended in all respects to be possible configurations rather than restrictive. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

The invention claimed is:

1. A method comprising:
determining, by a computing device, a plurality of partitions of a frame of content, wherein each partition of the plurality of partitions comprises a plurality of pixels;
generating, based on a partition of the plurality of partitions, first data indicating row-by-row differences or column-by-column differences between values of neighboring pixels of the plurality of pixels within the partition of the plurality of partitions;
generating, based on the first data, second data indicating a row-by-row summation or a column-by-column summation of the differences between values of neighboring pixels of the plurality of pixels for the partition of the plurality of partitions;
determining, based on the second data, a quality score for the frame of the content; and
based on the quality score, causing at least one remedial action, associated with the frame of the content, to be performed.

2. The method of claim 1, wherein the first data comprises a data structure comprising a quantity of values corresponding to a quantity of pixels within the frame.

3. The method of claim 1, wherein the second data comprises a data structure comprising a quantity of values corresponding to a pixel width associated with the frame of content.

4. The method of claim 1, wherein the quality score is indicative of an amount of perceptible blockiness within the frame.

5. The method of claim 1, wherein causing the at least one remedial action to be performed comprises:
determining, based on the quality score, that an amount of perceptible blockiness satisfies a quality threshold; and
based on the amount of perceptible blockiness satisfying the quality threshold, causing the at least one remedial action to be performed.

6. The method of claim 1, wherein the computing device comprises a user device, and wherein causing the at least one remedial action to be performed comprises at least one of:
sending, to an upstream device, the quality score, wherein the upstream device causes the at least one remedial action to be performed;
sending, to the upstream device, an indication that the quality score satisfies a quality threshold, wherein the upstream device causes the at least one remedial action to be performed;
causing at least one decoding parameter to be adjusted;
requesting an alternative source for the content; or requesting one or more portions of the content at a quality level that differs from a quality level associated with the frame.

7. The method of claim 1, wherein the computing device comprises an upstream device, and wherein causing the at least one remedial action to be performed comprises at least one of:
sending, to a user device, one or more portions of the content at a quality level that differs from a quality level associated with the frame;
causing at least one encoding parameter to be adjusted; or
determining an alternative source for the content.

8. A method comprising:
determining, by a computing device, based on a plurality of partitions of a first frame of content, a first quality score for the first frame, wherein the first quality score is indicative of row-by-row or column-by-column differences between pixel values within each partition of the plurality of partitions of the first frame;
based on a triggering event, determining, based on a plurality of partitions of a second frame of the content, a second quality score for the second frame, wherein the second quality score is indicative of row-by-row or column-by-column differences between pixel values within each partition of the plurality of partitions of the second frame; and
based on at least one of the first quality score or the second quality score, causing at least one remedial action, associated with at least one of the first frame or the second frame of the content, to be performed.

9. The method of claim 8, wherein the first quality score is indicative of an amount of perceptible blockiness within the first frame.

10. The method of claim 8, wherein determining the second quality score comprises determining, based on the triggering event, the second quality score for the second frame, wherein the triggering event comprises surpassing at least one of:
an amount of time;
a quantity of received frames of the content;
a quantity of received chunks of the content;
a quantity of received fragments of the content; or
a quantity of received segments of the content.

11. The method of claim 8, wherein the second quality score is indicative of an amount of perceptible blockiness within the second frame.

12. The method of claim 8, wherein causing the at least one remedial action to be performed comprises determining, based on at least one of the first quality score or the second quality score, that an amount of perceptible blockiness associated with the content satisfies a quality threshold.

13. The method of claim 8, wherein the computing device comprises a user device, and wherein causing the at least one remedial action to be performed comprises at least one of:
sending, to an upstream device, an indication of at least one of the first quality score or the second quality score, wherein the upstream device causes the at least one remedial action to be performed;
sending, to the upstream device, an indication that at least one of the first quality score or the second quality score satisfies a quality threshold, wherein the upstream device causes the at least one remedial action to be performed;
causing at least one decoding parameter to be adjusted;
requesting an alternative source for the content; or requesting one or more portions of the content at a quality level that differs from a quality level associated with the first frame and the second frame.

14. The method of claim 8, wherein the computing device comprises an upstream device, and wherein causing the at least one remedial action to be performed comprises at least one of:

sending, to a user device, one or more portions of the content at a quality level that differs from a quality level associated with the frame;

causing at least one encoding parameter to be adjusted; or determining an alternative source for the content.

15. A method comprising:

determining, by a first computing device of a plurality of computing devices, a first quality score for a first output of a frame of content by the first computing device, wherein the first quality score is indicative of row-by-row or column-by-column differences between pixel values within the first output by the first computing device;

determining, by a second computing device of the plurality of computing devices, a second quality score for a second output of the frame by the second computing device, wherein the second quality score is indicative of row-by-row or column-by-column differences between pixel values within the second output by the second computing device; and based on at least one of the first quality score or the second quality score, causing at least one remedial action, associated with the frame of the content, to be performed.

16. The method of claim 15, wherein the first computing device comprises an encoder, wherein the first output comprises the frame of the content encoded by the encoder, and wherein the first quality score is indicative of an amount of perceptible blockiness within the frame of the content encoded by the encoder.

17. The method of claim 15, wherein the second computing device comprises a user device, wherein the second output comprises the frame of the content decoded by the user device, and wherein the second quality score is indicative of an amount of perceptible blockiness within the frame of the content decoded by the user device.

18. The method of claim 15, wherein causing the at least one remedial action to be performed comprises:

determining, based on at least one of the first quality score or the second quality score, that an amount of perceptible blockiness associated with the content satisfies a quality threshold; and based on the amount of perceptible blockiness associated with the content satisfying the quality threshold, causing, by the first computing device or the second computing device, the at least one remedial action to be performed.

19. The method of claim 15, wherein causing the at least one remedial action to be performed comprises at least one of:

sending one or more portions of the content at a quality level that differs from a quality level associated with the frame;

causing at least one encoding parameter to be adjusted;

causing at least one decoding parameter to be adjusted; or determining an alternative source for the content.

20. The method of claim 15, wherein determining the first quality score comprises:

generating a first data structure indicating differences between pixel values within each partition of a plurality of partitions of the first output of the frame;

generating, based on the first data structure, a second data structure indicating a summation of the differences between the pixel values within each partition of the plurality of partitions of the first output of the frame; and determining, based on the second data structure, the first quality score.

* * * * *